United States Patent
Mizushima et al.

(10) Patent No.: US 11,186,018 B2
(45) Date of Patent: Nov. 30, 2021

(54) LAYERED SHEET, LAYERED SHEET PRE-PRODUCT, AND METHOD FOR PRODUCING LAYERED SHEET

(71) Applicant: DIATEX CO., LTD., Tokyo (JP)

(72) Inventors: Yoichi Mizushima, Kurobe (JP); Ken Itoh, Kurobe (JP); Yohei Tanabe, Kurobe (JP)

(73) Assignee: DIATEX CO., LTD., Tokyo (JP)

( * ) Notice: Subject to any disclaimer, the term of this patent is extended or adjusted under 35 U.S.C. 154(b) by 354 days.

(21) Appl. No.: 16/483,618

(22) PCT Filed: Feb. 6, 2018

(86) PCT No.: PCT/JP2018/004059
§ 371 (c)(1),
(2) Date: Aug. 5, 2019

(87) PCT Pub. No.: WO2018/143476
PCT Pub. Date: Aug. 9, 2018

(65) Prior Publication Data
US 2020/0031035 A1 Jan. 30, 2020

(30) Foreign Application Priority Data
Feb. 6, 2017 (JP) .............................. JP2017-019760

(51) Int. Cl.
*B29C 45/16* (2006.01)
*B32B 27/02* (2006.01)
(Continued)

(52) U.S. Cl.
CPC .............. *B29C 45/16* (2013.01); *B32B 27/02* (2013.01); *B32B 27/12* (2013.01); *B32B 27/32* (2013.01);
(Continued)

(58) Field of Classification Search
CPC ......... B29C 45/16; B32B 27/02; B32B 27/12; B32B 27/32; B32B 27/34; B32B 27/40;
(Continued)

(56) References Cited

FOREIGN PATENT DOCUMENTS

| | | | | |
|---|---|---|---|---|
| JP | 62-283181 | * 12/1987 | ............... | C09J 7/02 |
| JP | H1033067 A | 2/1998 | | |

(Continued)

OTHER PUBLICATIONS

English machine translation of JP2007-69587. (Year: 2007).*
English machine translation of JP2004-269775 (Year: 2004).*
WIPO, ISR for PCT/JP2018/004059, dated Apr. 3, 2018.

*Primary Examiner* — Michael C Miggins
(74) *Attorney, Agent, or Firm* — Hodgson Russ LLP

(57) ABSTRACT

An object of the present invention is to provide a layered sheet having improved mechanical properties and excellent interlayer adhesion. The object can be fulfilled by a layered sheet formed by layering a modified-polyolefin layer (3), a copolymerized polyamide layer, (4), and a thermoplastic polyurethane-based resin layer (5) in this order on at least one surface of a cloth layered sheet (2) formed by layering a plurality of cloths comprised of thermoplastic resin strands or a layered sheet formed by layering a modified-polyolefin layer (3), a copolymerized polyamide layer, (4), and a polyamide-based resin layer (6) in this order on at least one surface of a cloth layered sheet (2) formed by layering a plurality of cloths comprised of thermoplastic resin strands.

13 Claims, 3 Drawing Sheets

(51) Int. Cl.
  *B32B 27/12*   (2006.01)
  *B32B 27/32*   (2006.01)
  *B32B 27/34*   (2006.01)
  *B32B 27/40*   (2006.01)
  *D03D 1/00*    (2006.01)
  *D03D 15/00*   (2021.01)
(52) U.S. Cl.
  CPC .............. *B32B 27/34* (2013.01); *B32B 27/40* (2013.01); *B32B 2250/24* (2013.01); *B32B 2270/00* (2013.01); *D03D 1/00* (2013.01); *D03D 15/00* (2013.01)
(58) Field of Classification Search
  CPC .. B32B 2250/24; B32B 2270/00; D03D 1/00; D03D 15/00
  See application file for complete search history.

(56) References Cited

FOREIGN PATENT DOCUMENTS

| | | |
|---|---|---|
| JP | 3079054 B2 | 8/2000 |
| JP | 2004269775 A | 9/2004 |
| JP | 2007069587 A | 3/2007 |
| JP | 5138222 B2 | 2/2013 |
| WO | 03018306 A1 | 3/2003 |

\* cited by examiner

[FIG.1]
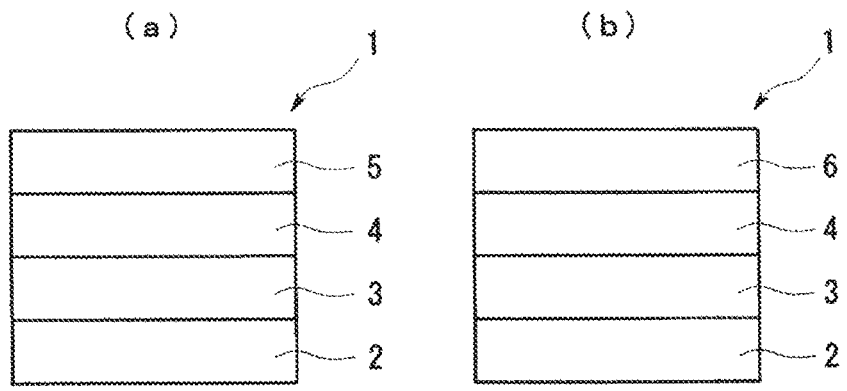
[FIG.2]
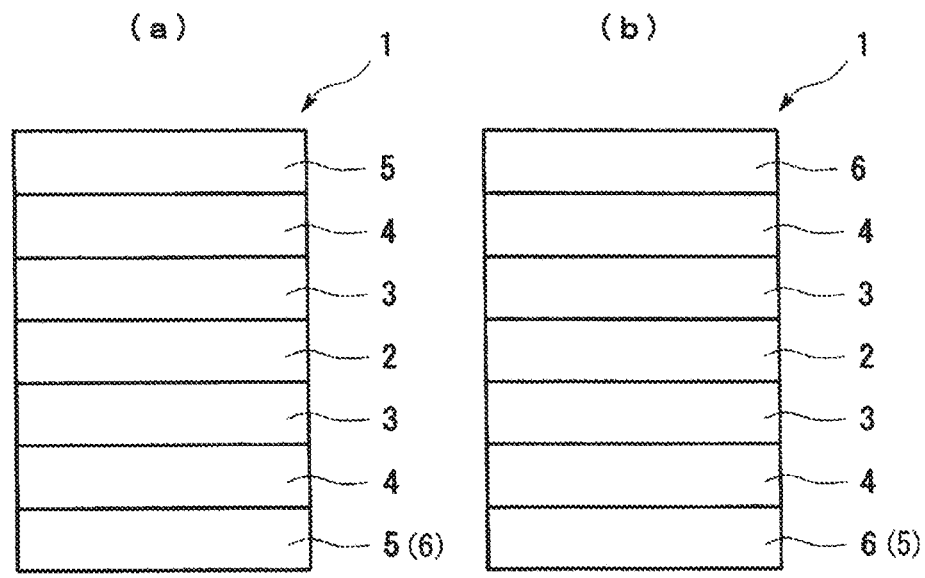

[FIG.3]
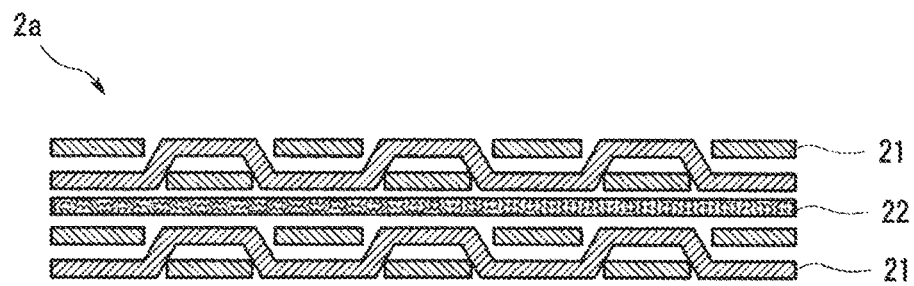
[FIG.4]
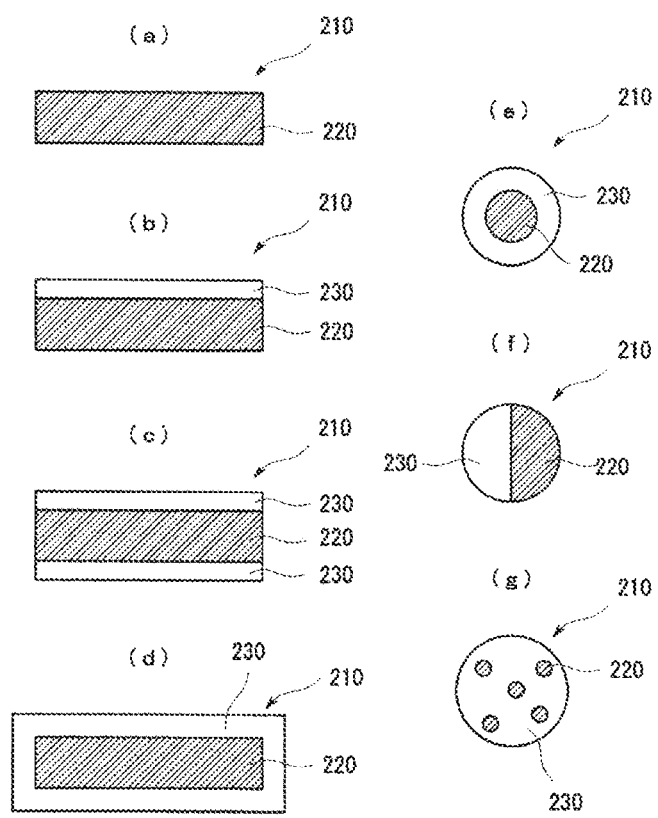

[FIG.5]
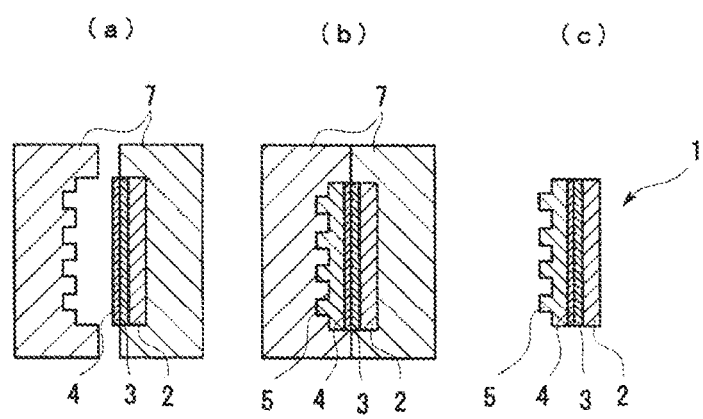

LAYERED SHEET, LAYERED SHEET PRE-PRODUCT, AND METHOD FOR PRODUCING LAYERED SHEET

CROSS-REFERENCE TO RELATED APPLICATIONS

This application is a National Stage of International Application No. PCT/JP2018/004059 filed Feb. 6, 2018, claiming priority based on Japanese Patent Application No. 2017-019760 filed Feb. 6, 2017, the contents of all of which are incorporated herein by reference in their entirety.

TECHNICAL FIELD

The present invention relates to a layered sheet, a layered sheet pre-product, and a method for producing the layered sheet, and more particularly, relates to a layered sheet having improved mechanical properties and excellent interlayer adhesion, a layered sheet pre-product, and a method for producing the layered sheet.

BACKGROUND

Patent Literature 1 discloses a method for producing a layered polymer product in which a plurality of woven fabrics composed of oriented polymer strands are layered and the layered woven fabrics are subjected to thermocompression bonding.

Patent Literature 1 recites that the mechanical properties of the obtained layered polymer product are excellent.

CITATION LIST

Patent Literature

Patent Literature 1: JP-B-5138222

SUMMARY OF THE INVENTION

Problem to be Solved by the Invention

Even when the mechanical properties of the layered polymer product mentioned above are excellent, further improvement in the mechanical properties has been required. For instance, a means for layering an abrasion resistant member on the surface of the layered polymer product can be considered as the means for improving the mechanical properties. However, such a layered sheet has been difficult to obtain. In particular, when the members having different compositions are layered to each other, interlayer adhesion has been difficult to obtain.

An object of the present invention is to provide a layered sheet having improved mechanical properties and excellent interlayer adhesion, a layered sheet pre-product, and a method for producing the layered sheet.

Other objects in the present invention will be revealed by the following descriptions.

Means for Solving Problem

A first layered sheet according to the present invention is characterized in that a modified-polyolefin layer, a copolymerized polyamide layer, and a thermoplastic polyurethane-based resin layer are layered in this order on one side of a cloth layered sheet formed by layering a plurality of cloths comprised of thermoplastic resin strands.

A second layered sheet according to the present invention is characterized in that a modified-polyolefin layer, a copolymerized polyamide layer, and a polyamide-based resin layer are layered in this order on one side of a cloth layered sheet formed by layering a plurality of cloths comprised of thermoplastic resin strands.

In the first or second layered sheet, a modified-polyolefin layer, a copolymerized polyamide layer, and a thermoplastic polyurethane-based resin layer or a polyamide-based resin layer are preferably layered in this order on the other side of the cloth layered sheet. In the layered sheet, the modified-polyolefin layer is preferably at least one modified-polyolefin selected from acid-modified modified polypropylene or acid-modified modified polyethylene. In the layered sheet, the modified-polyolefin layer and the copolymerized polyamide layer are preferably films.

A first layered sheet pre-product according to the present invention is characterized in that a modified-polyolefin layer and a copolymerized polyamide layer are layered in this order on one side of a cloth layered sheet formed by layering a plurality of cloths comprised of thermoplastic resin strands. In the first layered sheet pre-product, a modified-polyolefin layer and a copolymerized polyamide layer are preferably layered in this order on the other side of the cloth layered sheet.

A method for producing a layered sheet according to the present invention includes the steps of providing a cloth layered sheet formed by layering a plurality of cloths comprised of thermoplastic resin strands and thereafter subjecting the layered cloths to thermocompression bonding; layering a modified-polyolefin layer on one side or both sides of the cloth layered sheet; layering a copolymerized polyamide layer on the upper surface of the modified-polyolefin layer; and subsequently layering a thermoplastic polyurethane-based resin layer or a polyamide-based resin layer on the upper surface of the copolymerized polyamide layer. In the method for producing a layered sheet, it is preferable that the modified-polyolefin layer and the copolymerized polyamide layer be films, the cloth layered sheet be disposed in a mold, the modified-polyolefin layer be disposed on one surface or both surfaces of the cloth layered sheet, the copolymerized polyamide layer be disposed on the upper surface of the modified-polyolefin layer, and a resin forming the thermoplastic polyurethane-based resin layer or a resin forming the polyamide-based resin layer be injected into the mold from the upper surface side of the copolymerized polyamide layer.

A method for producing a layered sheet pre-product according to the present invention includes the steps of providing a cloth layered sheet formed by layering a plurality of cloths comprised of thermoplastic resin strands and thereafter subjecting the layered cloths to thermocompression bonding; layering a modified-polyolefin layer on one side or both sides of the cloth layered sheet; and layering a copolymerized polyamide layer on the upper surface of the modified-polyolefin layer.

Another method for producing a layered sheet pre-product according to the present invention includes the steps of providing a plurality of cloths comprised of thermoplastic resin strands, layering a modified-polyolefin layer on one side or both sides of the cloths; and layering a copolymerized polyamide layer on the upper surface of the modified-polyolefin layer.

In the method for producing a layered sheet pre-product, the modified-polyolefin layer and the copolymerized polyamide layer are preferably films and are preferably integratedly obtained by thermocompression bonding.

A method for producing a layered sheet according to the present invention includes the steps of providing the layered sheet pre-product obtained by the method for producing a layered sheet pre-product; disposing the layered sheet pre-product in a mold; and injecting a resin forming the thermoplastic polyurethane-based resin layer or a resin forming the polyamide-based resin layer into the mold from the upper surface side of the copolymerized polyamide layer in the layered sheet pre-product.

Effect of the Invention

According to the present invention, a layered sheet having improved mechanical properties and excellent interlayer adhesion can be provided.

According to the present invention, a layered sheet pre-product comprised of the cloth layered sheet, the modified-polyolefin layer, and the copolymerized polyamide layer can be obtained and the layered sheet having excellent versatility can be provided.

According to the present invention, methods for producing the layered sheet and the layered sheet pre-product that contribute to improvement in productivity can be provided.

BRIEF DESCRIPTION OF DRAWINGS

FIGS. 1(a) and 1(b) are diagrams showing an example of the layer constitution of the layered sheet according to the present invention;

FIGS. 2(a) and 2(b) are diagrams showing another example of the layer constitution of the layered sheet according to the present invention;

FIG. 3 is a cross-sectional view showing an example of a cloth layered sheet pre-product for obtaining a cloth layered sheet;

FIGS. 4(a) to 4(g) are diagrams showing the structure of a strand; and

FIGS. 5(a) to 5(c) are diagrams showing an example of a layered sheet.

DESCRIPTION OF THE EMBODIMENTS

Hereinafter, embodiments of the present invention will be described in detail.

(First Layered Sheet)

First, with reference to FIG. 1(a), an example of the layer constitution of the first layered sheet according to the present invention will be described.

The layered sheet 1 shown in FIG. 1(a) is formed by layering the modified-polyolefin layer 3, the copolymerized polyamide layer 4, and the thermoplastic polyurethane-based resin layer 5 in the order mentioned above on one side of the cloth layered sheet 2.

In this aspect, the layered sheet having improved mechanical properties can be obtained by disposing the modified-polyolefin layer 3 and the copolymerized polyamide layer 4 in the order mentioned above between the cloth layered sheet 2 and the thermoplastic polyurethane-based resin layer 5. In particular, desired adhesion between each layer is achieved and a function of not causing delamination between layers is achieved by layering each of the layers in the order mentioned above.

As the cloth layered sheet 2, a product formed by layering a plurality of cloths comprised of thermoplastic resin strands and thereafter subjecting the layered cloths to thermocompression bonding is suitably used. As the cloth layered sheet 2 in this aspect, a product formed by folding one cloth comprised of thermoplastic resin strands and subjecting the folded cloth to thermocompression bonding may be used or a product formed by layering a plurality of folded cloths and subjecting the layered cloths to thermocompression bonding may be used.

The modified-polyolefin layer 3 is comprised of modified polyolefin. The modified-polyolefin layer 3 strongly adheres to the cloth layered sheet 2 as well as strongly adheres to the copolymerized polyamide layer 4.

The copolymerized polyamide layer 4 is comprised of copolymerized polyamide. The copolymerized polyamide layer 4 strongly adheres to the thermoplastic polyurethane-based resin layer 5 as well as strongly adheres to the modified-polyolefin layer 3.

The thermoplastic polyurethane-based resin layer 5 is comprised of a thermoplastic polyurethane-based resin. This allows the layered sheet 1 to achieve, for instance, excellent abrasion resistance.

The layered sheet 1 can be produced by layering the modified-polyolefin layer, the copolymerized polyamide layer, and the thermoplastic polyurethane-based resin layer in this order on one side of the cloth layered sheet 2.

[Cloth Layered Sheet]

First, the cloth layered sheet 2 is provided. As the cloth layered sheet 2, a product formed by layering a plurality of cloths comprised of thermoplastic resin strands and thereafter subjecting the layered cloths to thermocompression bonding is used.

FIG. 3 is a cross-sectional view showing an example of a cloth layered sheet pre-product 2a constituted of a plurality of cloths 21 subjecting to thermocompression bonding.

The aspect in FIG. 3 shows that the cloth layered sheet pre-product 2a formed by layering two cloths 21 and 21 and further sandwiching an intermediate layer 22 between the two cloths 21 and 21. In the aspect in FIG. 3, the cloth 21 is a woven fabric.

The cloth can be formed by using the thermoplastic resin strands comprised of, for instance, monofilaments, tapes, yarns, split yarns, multifilaments, and staple fibers of stretched thermoplastic resin.

The cloth may be a woven fabric by weaving, a cross-linked cloth formed by orthogonally arranging a great number of strands comprised of thermoplastic resin orthogonally side by side to form a planer object and joining the resulting intersections, or a knitting and a braid formed of the strands comprised of the thermoplastic resins mentioned above.

The strand is constituted of a high-melting point resin component having a melting point higher than the temperature at thermocompression bonding as a main component and can contain a low-melting point resin component having a melting point lower than the temperature at thermocompression bonding.

As the structure of the strand, the aspect as shown in FIG. 4 can be exemplified. FIG. 4(a) is an example in which the strand 210 is a single layer strand formed of a base layer 220 alone. In the case of this example, the resin constituting the strand is constituted of the high-melting point resin component and may contain the low-melting point resin component within a range not impairing the effect of the present invention.

FIGS. 4(b) and 4(c) illustrate examples of layering structures in which the strand 210 is formed by layering the surface layer 230 comprised of a thermoplastic resin having a lower melting point than the base layer 220 on one surface or both surfaces of the base layer 220.

FIGS. 4(d) and 4(e) are examples of sheath-core structures in which the surface layer 230 comprised of the thermoplastic resin having a lower melting point than the base layer 220 surrounds the base layer 220.

FIG. 4(f) is an example of a side-by-side structure and FIG. 4(g) is an example of a sea-island structure.

Preferable examples of the thermoplastic resin constituting the strand used for the cloth include polyolefin such as polypropylene and polyethylene and polyester such as polyethylene terephthalate. Of these thermoplastic resins, polypropylene is particularly suitable.

When the layering structure is used as the strand 210, the means for molding a layered film as a molding material can be appropriately selected and used from means such as:

(1) means for previously forming the film to be the base layer 220 and the film to be the surface layer 230 and layering the films using a dry laminate method or a heat laminate method;

(2) means for coating the thermoplastic resin to be the surface layer 230 on the surface of the film to be the base layer 220;

(3) means for extrusion laminating the surface layer 230 on the previously formed film to be the base layer 220; or (4) means for extrusion molding a layered film by a multilayer coextrusion method.

Stretched strands 210 can be obtained by stretching the film to be the base layer 220, for instance, in the uniaxial direction, thereafter layering the thermoplastic resin to be the surface layer 230, and slitting the layered product to form a tape-like product. Alternatively, the strands 210 can also be obtained by slitting the layered film obtained by layering the base layer 220 and the surface layer 230 and thereafter stretching the layered film in the uniaxial direction.

The method for stretching the films is not specifically restricted, and a film can be stretched by single- or multi-stage stretching using a heated roll, a hot plate, a hot air furnace, hot water, hot oil, steam, infrared radiation, or the like. The strands are not necessarily all stretched strands. Unstretched strands may be mixed in a range where the unstretched strands do not so much affect the strength.

The thickness of the strand can be appropriately selected depending on intended purposes. In general, the thickness is desirably in the range of 50 dtex (dt) to 10,000 dtex (dt) in the case of the layering structure, whereas the thickness is desirably in the range of 1 dtex (dt) to 10,000 dtex (dt) in the case of the sheath-core structure (enclosed structure) as shown in FIGS. 4(d) and 4(e).

The intermediate layer 22 is disposed between the cloth 21 and the cloth 21 and has a function that adheres between these cloth 21 and the cloth 21 and improve rigidity of the obtained cloth layered sheet.

The intermediate layer 22 is constituted of a thermoplastic resin. As this thermoplastic resin, a product in which the low-melting point resin component contains the high-melting point resin component can be used. The thermoplastic resin containing the high-melting point resin component in the low-melting point resin component allows the intermediate layer to function as a rigidity improving layer.

In this specification, the term "melting point" refers to a temperature measured with differential scanning calorimetry (DSC) measurement as a melting peak temperature. In other words, the high-melting point resin component and the low-melting point resin component have relation in which the high-melting point resin component has a higher melting peak temperature than the low-melting point resin component. The intermediate layer 22 may show two melting peak temperatures originated from these resins.

Preferable examples of the low-melting point resin component used in the intermediate layer 22 include polyolefin such as polypropylene and polyethylene and polyester such as polyethylene terephthalate. Of these thermoplastic resins, polyolefin is preferable and polypropylene is more preferable.

As the high-melting point resin component used for the intermediate layer 22, a component having a higher melting point than the low-melting point resin component may be used. Preferable examples of the high-melting point resin component include polyolefin such as polypropylene and polyethylene and polyester such as polyethylene terephthalate. Of these high-melting point resin components, polypropylene is particularly suitable.

When each of the low-melting point resin component and the high-melting point resin component used in the intermediate layer 22 is selected from polypropylene, for instance, random polypropylene is used as the low-melting point resin component and homo polypropylene is used as the high-melting point resin component.

The random polypropylene is a randomly copolymerized product of propylene as the monomer components and α-olefin (for instance, α-olefin other than propylene such as ethylene, 1-butene, 1-pentene, 1-hexene, 4-methyl-1-pentene, 1-heptene, and 1-octene).

The α-olefin can be preferably used, for instance, in a ratio of 20% by weight or lower and more preferably in a ratio of 10% by weight or lower relative to the total monomer component. The ratio of the α-olefin can be adjusted so as to exhibit a desired melting point.

In the other aspect in which each of the low-melting point resin component and the high-melting point resin component used in the intermediate layer 22 is selected from polypropylene, random polypropylene having relatively low melting point may be used as the low-melting point resin component and random polypropylene having relatively high melting point may be used as the high-melting point resin component.

As mentioned above, the melting point of the random polypropylene can be set by, for instance, adjusting the ratio of the α-olefin. Specifically, for instance, random polypropylene having a lower α-olefin ratio than the ratio of the random polypropylene used as the low-melting point resin component can be used as the high-melting point resin component.

As the intermediate layer 22, a film formed by kneading the pellets of the low-melting point resin component and the pellets of the high-melting point resin component at a temperature higher than the melting points of both resin components and molding the kneaded resin components by inflation molding can be used.

A non-woven fabric can also be used as the intermediate layer 22.

As the non-woven fabric, a non-woven fabric formed by kneading the pellets of the low-melting point resin component and the pellets of the high-melting point resin component at a temperature higher than the melting points of both resin components and molding the kneaded resin components by fleece molding methods such as spunbond and melt blow may be used or a non-woven fabric formed by thermal bonding, chemical bonding, needle punching, a spun-lace fleece bonding method, or the like may be used.

In the intermediate layer 22, the content of the high-melting point resin component is, for instance, preferably in the range of 5% by weight to 50% by weight and further preferably in the range of 10% by weight to 30% by weight.

The weight ratio of the low-melting point resin component and the high-melting point resin component in the intermediate layer 22 is preferably in the range of 5:95 to 50:50 and further preferably in the range of 10:90 to 30:70.

The thickness of the intermediate layer 22 is not restricted because the thickness can be appropriately set depending on, for instance, the thickness of the cloth and the thickness of the strand constituting the cloth, and is preferably in the range of 10 μm to 100 μm, and further preferably 20 μm to 60 μm.

The cloth layered sheet 2 can be produced by subjecting the cloth layered sheet pre-product 2a mentioned above to thermocompression bonding at a predetermined temperature and subsequently cooling the bonded cloth layered sheet pre-product 2a.

When the intermediate layer in which the high-melting point resin component is contained in the low-melting point resin component is used, the obtained cloth layered sheet 2 exhibits the effect of excellent rigidity by thermocompression bonding at a temperature between the melting point or higher temperature of the low-melting point resin component and a temperature lower than the melting point of the high-melting point resin component.

The method of the thermocompression bonding is not specifically restricted and, for instance, a hot press may be used. The pressure of the hot press is not specifically restricted and can be appropriately set depending on the thickness of each layer or the like. The pressure is, for instance, preferably in the range of 0.5 MPa to 20 MPa and further preferably in the range of 2 MPa to 15 MPa.

The time for thermocompression bonding is not specifically restricted so long as the thermocompression bonding can be achieved. For instance, the time is preferably in the range of 1 minute to 20 minutes.

Cooling after the thermocompression bonding may be natural cooling or forced cooling. When the forced cooling is used, a method of maintaining the compression bonding state at the time of thermocompression bonding and lowering the temperature to a cooling temperature can be employed. In this case, a method of cooling press can be employed.

The pressure of the cooling press is not specifically restricted and appropriately set depending on the thickness of each layer or the like. For instance, the pressure is preferably in the range of 0.5 MPa to 20 MPa and further preferably 2 MPa to 15 MPa.

The time for cooling is not specifically restricted so long as the cooling can be achieved. For instance, the time is preferably in the range of 10 seconds to 20 minutes.

In the above description, the case where the cloth layered sheet 2 is formed by layering two cloths 21. However, the upper limit of the number of the cloths 21 to be layered is not restricted.

For instance, the number of the cloths 21 to be layered can be appropriately set depending on the intended applications so that the cloth layered sheet 2 has a desired thickness. The number of the cloths 21 to be layered is, for instance, in the range of 2 to 50.

When two cloths are layered, a layering structure comprised of a cloth, an intermediate layer, and a cloth can be adopted.

When three cloths are layered, a layering structure comprised of a cloth, an intermediate layer, a cloth, an intermediate layer, and a cloth can be adopted.

When four cloths are layered, a layering structure comprised of a cloth, an intermediate layer, a cloth, an intermediate layer, a cloth, an intermediate layer, a cloth can be adopted.

When the number of the cloths is increased to five or more, similar to the example of the aspects of the three or four cloths, each of the intermediate layers is disposed between the cloth and cloth so that the number of the cloths reaches a predetermined number of the cloths.

In the above description, the aspect in which the intermediate layer 22 is disposed between the cloths 21 and 21 at the time of layering the cloths 21 is mainly described. However, the intermediate layer 22 may be appropriately omitted depending on the rigidity that is required for the cloth layered sheet 2.

Further, an adhesive layer, which is not shown, may be disposed between the cloths 21. The adhesive used for the adhesive layer is not specifically restricted and a selected commercially available product may be used in the range where the effect of the present invention is not impaired.

Method of providing the adhesive layer is not specifically restricted and examples of the method include spraying, dip coating, and brush coating.

When the adhesive layer is used, the intermediate layer 22 and the adhesive layer may be used together. When the intermediate layer 22 and the adhesive layer are used together, the adhesive layer may be formed on one surface or both surfaces of the intermediate layer 22.

Depending on the strength and rigidity required for the cloth layered sheet 2, the above-mentioned intermediate layer 22 and adhesive layer may be appropriately omitted.

In particular, the layering structure as shown in FIG. 4(c) and the sheath-core structures shown in FIGS. 4(d) and 4(e) allow high strength to be obtained even when the intermediate layer and the adhesive layer are omitted. In this case, at the time of the thermocompression bonding of the cloth layered sheet pre-product, the low-melting point resin component constituting the surface layer of the strands used for the cloth is melted to integrate the cloths with each other by the thermocompression bonding.

In this aspect, the method for forming the cloth layered sheet is not restricted to the aspect as mentioned above.

One preferable aspect of the first layered sheet 1 is a layered sheet formed by layering the modified-polyolefin layer 3, the copolymerized polyamide layer 4, and the thermoplastic polyurethane-based resin layer 5 in this order on one surface of the cloth layered sheet 2 as shown in FIG. 1.

[Modified-Polyolefin Layer]

The modified-polyolefin layer 3 is preferably comprised of modified-polyolefin made by modifying polyolefin. Further, as the modified-polyolefin layer 3, at least one modified-polyolefin selected from acid-modified polypropylene or acid-modified polyethylene may be used.

The polyolefin may be a homopolymer or a copolymer. As the monomer of the polyolefin, ethylene and propylene can be exemplified. The monomers may be used singly or in combination of two or more of the monomers.

The copolymer may be any one of random copolymer, alternating copolymer, block copolymer, or graft copolymer.

In this aspect, these polymers can be used singly or in combination of two or more of the polymers. Of these polymers, polypropylene and polyethylene are particularly preferably used as the polyolefin.

Examples of methods for modifying the polyolefin include a method for acid modification. As the method for acid modification, a method for graft polymerizing an organic acid having a carboxy group to the polyolefin can be used.

Such graft polymerization allows the acid-modified polyolefin in which an organic acid component is grafted to the polyolefin is obtained. The method for polymerization is not restricted to the graft polymerization and any methods can be appropriately selected and used.

Type of the organic acid is not specifically restricted and a saturated or unsaturated carboxylic acid or carboxylic anhydride having at least one or more carboxy groups is preferable.

Examples of the organic acid include:

(1) carboxylic acids such as maleic acid, fumaric acid, mesaconic acid, citraconic acid, itaconic acid, aconitic acid, crotonic acid, succinic acid, oxalic acid, malonic acid, malic acid, thiomalonic acid, tartaric acid, adipic acid, citric acid, pimelic acid, suberic acid, azelaic acid, acrylic acid, tetrahydrophthalic acid, isocrotonic acid, endo-cis-bicyclo(2.2.1)hept-5-ene-2,3-dicarboxylic acid, and sebacic acid; and (2) carboxylic anhydrides such as maleic anhydride, itaconic anhydride, citraconic anhydride, and succinic anhydride.

The organic acids may be used singly or may be used in combination of two or more of the organic acids.

When the modified polyolefin is produced by acid modification, the polyolefin can usually be modified so that an organic acid may be contained in a ratio of 0.01% by weight to 10% by weight relative to the polyolefin. When the content of the organic acid is smaller than 0.01% by weight, the interlayer adhesion is poor when the modified-polyolefin layer is layered between the cloth layered sheet layer and the copolymerized polyamide layer, which is unfavorable. When the content of the organic acid is larger than 10% by weight, a melt viscosity increases because significant crosslink of the polyolefin is generated when the polyolefin containing a molecular crosslink-type monomer as the main component is modified and the melt viscosity decreases because the significant main chain cleavage occurs when the polyolefin containing a molecular cleavage-type monomer as the main component is modified. As a result, the interlayer adhesion becomes poor when the modified-polyolefin layer is layered between the cloth layered sheet layer and the copolymerized polyamide layer.

The modified-polyolefin layer may contain other resins such as non-modified polyolefin in addition to the modified polyolefin mentioned above within a range not impairing the effect of the present invention.

The form of the modified-polyolefin layer 3 is not specifically restricted. For instance, the form may be a film-like form or sheet-like form and a state where the modified polyolefin is melted in order to provide for, for instance, extrusion laminating. From the viewpoint of versatility, the form is preferably the film-like form or the sheet-like form.

[Copolymerized Polyamide Layer]

The copolymerized polyamide layer 4 is preferably comprised of copolymerized polyamide.

The copolymerized polyamide may be aliphatic copolymerized polyamide, may be alicyclic copolymerized polyamide, may be aromatic copolymerized polyamide, or may be one of these copolymerized polyamides or a mixture of these copolymerized polyamides.

The copolymerized polyamide can be formed by combining dicarboxylic acid components and a plurality of amide-forming components selected from diamine components, lactam components, and aminocarboxylic acid components and copolymerizing these components.

Examples of the dicarboxylic acid components include aliphatic dicarboxylic acids and alkane dicarboxylic acid components. These dicarboxylic acid components may be used singly or may be used in combination of two or more of these dicarboxylic acid components.

Examples of the diamine components include aliphatic diamine components and alkylene diamine components. These diamine components may be used singly or may be used in combination of two or more of these diamine components.

Examples of the lactam components include $C_{4-20}$ lactams such as δ-valerolactam, ε-caprolactam, ω-heptalactam, ω-octalactam, ω-decanelactam, ω-undecanelactam, ω-laurolactam (or ω-laurinlactam). These lactam components may be used singly or may be used in combination of two or more of these lactam components.

Examples of the aminocarboxylic acid components include $C_{6-20}$ aminocarboxylic acids such as ω-aminodecanoic acid, ω-aminoundecanoic acid, and ω-aminododecanoic acid. These aminocarboxylic acid components may be used singly or may be used in combination of two or more of these aminocarboxylic acid components.

Further, the copolymerized polyamide may contain long chain components having a long aliphatic chain (long chain alkylene group or alkenylene group) as constitutional units.

Such long chain components include components having a long aliphatic chain or alkylene group having about 8 to about 36 carbon atoms (preferably a $C_{8-16}$ alkylene group, and more preferably a $C_{10-14}$ alkylene group).

As the long chain components, for instance, one component selected from a $C_{8-18}$ alkane dicarboxylic acid, a $C_{9-17}$ lactam, and an amino-$C_{9-17}$ alkanecarboxylic acid may be used or a combination of two or more of these components may be used.

As the copolymerized polyamide, a commercially available product can be appropriately selected and used.

The copolymerized polyamide layer 4 may contain other resins such as homopolyamide in addition to the copolymerized polyamide mentioned above within a range not impairing the effect of the present invention. The homopolyamide, for instance, may be homopolyamide comprised of the amide-forming component forming the copolymerized polyamide.

Further, the copolymerized polyamide layer 4 may contain other components in addition to the above-mentioned components within a range not impairing the effect of the present invention. Examples of the other components include modified polyolefin, unmodified polyolefin, and an acrylic resin.

The form of the copolymerized polyamide layer 4 is not specifically restricted. For instance, the form may be a film-like form or sheet-like form and a state where the copolymerized polyamide is melted in order to provide for extrusion laminating. From the viewpoint of versatility, the form is preferably the film-like form or the sheet-like form.

[Thermoplastic Polyurethane-Based Resin Layer]

The thermoplastic polyurethane-based resin layer 5 is comprised of a thermoplastic polyurethane-based resin.

The thermoplastic polyurethane-based resin can be obtained by reacting a diol with a diisocyanate.

Examples of the thermoplastic polyurethane-based resin include polycarbonate-based, polyester-based, polyether-based, acrylic-based, and aliphatic-based polyurethane resins. In the present invention, these polyurethane resins may be used singly or in combination of two or more of these polyurethane resins.

Examples of the diol include ethylene glycol, diethylene glycol, propylene glycol, dipropylene glycol, 1,3-butanediol, and 1,4-butanediol.

Examples of the diisocyanate include aromatic diisocyanates, aliphatic diisocyanates, and alicyclic diisocyanates. These diisocyanates may be used singly or may be used in combination of two or more of these diisocyanates.

Examples of the aromatic diisocyanate include 1,4-phenylene diisocyanate, 2,4-toluene diisocyanate, 2,6-toluene diisocyanate, 2,2-methylenediphenylene diisocyanate, and naphthalene diisocyanate.

Examples of the aliphatic diisocyanates include hexamethylene diisocyanate.

Examples of the alicyclic diisocyanate include isophorone diisocyanate, 4,4'-methylene-bis-(cyclohexyl isocyanate), 1,3-bis-(isocyanatomethyl)cyclohexane, and 1,4-bis-(isocyanatomethyl)cyclohexane.

The diisocyanate may be dimers and trimers of the aromatic diisocyanates, aliphatic diisocyanates, and alicyclic diisocyanates, carbodiimide-modified products of these isocyanate compounds, prepolymers of these isocyanate compounds with polyvalent alcohols, or blocked isocyanate compounds in which these isocyanate compounds are blocked with a blocking agent such as phenol, primary alcohols, and caprolactam.

To the strands and intermediate layer used in the cloth layered sheet, the modified-polyolefin layer, the copolymerized polyamide layer, and the thermoplastic polyurethane-based resin layer, various additives may be added depending on intended purposes.

Specific examples of the additives include organic phosphorus-based and thioether-based antioxidants; hindered amine-based light stabilizers; benzophenone-based, benzotriazole-based, and benzoate-based ultraviolet absorbers; an antistatic agent; bisamide-based, wax-based, and organometallic salt-based dispersants; amide-based and organometallic salt-based lubricants; bromine-containing organic-based, phosphoric acid-based, melamine cyanurate-based, and antimony trioxide fire retardants; low-density polyethylene-based and linear low-density polyethylene-based stretching aids; organic pigments; inorganic pigments; inorganic fillers; organic fillers; metal ion-based inorganic antibacterial agents; and organic antibacterial agents.

(Method for Producing First Layered Sheet)

Subsequently, a method for producing the first layered sheet will be described.

The method for producing the first layered sheet is not specifically restricted. Depending on methods for forming the thermoplastic polyurethane-based resin layer in the layered sheet, the methods as described in the following (1) to (3) can be preferably exemplified. Of these methods, the following method (1) is preferable from the viewpoint of mass production.

(1) A method in which the components disposed in the lower part are disposed in a mold and a melted resin is injected to form the thermoplastic polyurethane-based resin layer. The term "components disposed in the lower part" refers to a layered product of the cloth layered sheet, the modified-polyolefin layer, and the copolymerized polyamide layer or the layered sheet pre-product mentioned below.

One aspect may include the steps of:
disposing a cloth layered sheet in a mold;
disposing a modified-polyolefin layer on one surface of the cloth layered sheet;
disposing a copolymerized polyamide layer on the upper surface of the modified-polyolefin layer; and
injecting a resin forming a thermoplastic polyurethane-based resin layer into the mold from the upper surface side of the copolymerized polyamide layer.

In this aspect, interlayer adhesion can also be achieved by melting at least each surface of the components disposed in the lower part due to heat of the melted resin.

Another aspect may include the steps of:
disposing a layered sheet pre-product in a mold; and
injecting a resin forming a thermoplastic polyurethane-based resin layer into the mold from the upper surface side of the copolymerized polyamide layer in the layered sheet pre-product.

In this aspect, interlayer adhesion can be achieved by melting at least the surface of the layered sheet pre-product due to heat of the melted resin.

(2) A method in which the thermoplastic polyurethane-based resin layer is layered on the upper surface of the components disposed in the lower part and subjecting the layered product to thermocompression bonding when the thermoplastic polyurethane-based resin layer is a film. The term "components disposed in the lower part" refers to a layered product formed by layering the cloth layered sheet, the modified-polyolefin layer, and the copolymerized polyamide layer in this order, a layered product formed by layering the cloths, the modified-polyolefin layer, and the copolymerized polyamide layer in this order, or the layered sheet pre-product mentioned below.

An aspect may include steps of:
providing a cloth layered sheet;
layering a modified-polyolefin layer on one surface of a cloth layered sheet;
layering a copolymerized polyamide layer on the upper surface of the modified-polyolefin layer; and
layering a thermoplastic polyurethane-based resin layer on the upper surface side of the copolymerized polyamide layer and subjecting the layered product to thermocompression bonding.

Another aspect may include the steps of:
providing a plurality of cloths;
layering a modified-polyolefin layer on one surface of the cloths;
layering a copolymerized polyamide layer on the upper surface of the modified-polyolefin layer; and
layering a thermoplastic polyurethane-based resin layer on the upper surface side of the copolymerized polyamide layer and subjecting the layered product to thermocompression bonding.

Another aspect may include the steps of:
providing a layered sheet pre-product;
layering a thermoplastic polyurethane-based resin layer on the upper surface side of the copolymerized polyamide layer in the layered sheet pre-product and subjecting the layered product to thermocompression bonding.

As the thermocompression bonding, all layers may be subjected to thermocompression bonding at once or the layers are divided into several layers and these several layers are subjected stepwise to thermocompression bonding.

(3) A method in which a melted resin is extruded in the form of layers onto the components disposed in the lower part to form a thermoplastic polyurethane-based resin layer. The term "components disposed in the lower part" refers to the layered sheet pre-product mentioned below.

An aspect may include the steps of:
providing a layered sheet pre-product;
extruding a melted resin forming a thermoplastic polyurethane-based resin layer in the form of layers on the upper surface side of the copolymerized polyamide layer in the layered sheet pre-product using, for instance, a T-die.

In this aspect, interlayer adhesion can be achieved by melting at least the surface of the layered sheet pre-product due to heat of the melted resin.

In the production method (1) to (3), the modified-polyolefin layer and the copolymerized polyamide layer are preferably films.

One aspect of the method (1) will be described in detail with reference to FIG. 5.

First, as shown in FIG. 5(a), the cloth layered sheet 2 is disposed on the part of the inner surface of a mold 7 and the modified-polyolefin layer 3 is overlapped onto the cloth layered sheet 2, followed by overlapping the copolymerized polyamide layer 4. In this process, the modified-polyolefin layer 3 is disposed on the cloth layered sheet 2 side.

When the modified-polyolefin layer 3 and/or the copolymerized polyamide layer 4 is a film, an effect exhibiting excellent handling property at the time of setting the film in the mold 7 is obtained, which is preferable.

Subsequently, as shown in FIG. 5(b), the mold 7 is closed and a resin forming the thermoplastic polyurethane-based resin layer 5 is injected onto the upper surface side of the copolymerized polyamide layer in the mold 7. In this process, the resin forming the thermoplastic polyurethane-based resin layer 5 is melted.

Subsequently, the mold 7 opens and thus the layered sheet 1 in which the thermoplastic polyurethane-based resin layer 5 is layered on the cloth layered sheet 2 through the modified-polyolefin layer 3 and the copolymerized polyamide layer 4 in this order is obtained.

In the examples of FIG. 5, a protrusion-recess shape based on the shape of the inner surface of the mold 7 is provided. However, the surface shape of the thermoplastic polyurethane-based resin layer 5 is not restricted to this shape. Use of the production method (1) allows the various shapes of the layered sheet to be suitably provided in high flexibility. Use of this method also allows the productivity to be improved.

In the example of FIG. 5, the production method in which the layered sheet comprised of the cloth layered sheet 2, the modified-polyolefin layer 3, the copolymerized polyamide layer 4, and the thermoplastic polyurethane-based resin layer 5 is molded at once is described. However, the production method is not restricted to this method.

(Second Layered Sheet)

The second layered sheet will be described below with reference to FIG. 1(b). FIG. 1(b) is a diagram showing an example of the layer constitution of the second layered sheet and represents the aspect of the second layered sheet. In FIG. 1(b), the parts having the same reference numerals as in FIG. 1(a) described in the above-mentioned first layered sheet are the parts having the same constitution. For the part not particularly described, the above description for the first layered sheet is used as a reference and description of the part will be omitted here.

The second layered sheet 1 is comprised by layering the modified-polyolefin layer 3, the copolymerized polyamide layer 4, and the polyamide-based resin layer 6 in this order on one surface of the cloth layered sheet 2.

In this aspect, the layered sheet having improved mechanical properties can be obtained by providing the modified-polyolefin layer 3 and the copolymerized polyamide layer 4 in the order mentioned above between the cloth layered sheet 2 and the polyamide-based resin layer 6.

In particular, a function of strongly adhering between the layers can be achieved by layering each of the layers in the order mentioned above.

[Polyamide-Based Resin Layer]

The polyamide-based resin layer 6 is comprised of a polyamide-based resin.

The polyamide-based resin may be an aliphatic polyamide-based resin, an alicyclic polyamide-based resin, an aromatic polyamide-based resin, or may be one of these polyamide-based resins or a mixture of these polyamide-based resins.

The polyamide-based resin may be a modified polyamide, may be a polyamide block copolymer, or further may be a composition thereof.

The polyamide-based resin may be formed by combining dicarboxylic acid components, diamine components, lactam components, and aminocarboxylic acid components.

Examples of the dicarboxylic acid components include aliphatic dicarboxylic acid components, aliphatic dicarboxylic acid components, and alkane dicarboxylic acid components. These dicarboxylic acid components may be used singly or may be used in combination of two or more of these dicarboxylic acid components.

Examples of the diamine components include aliphatic diamines, alkylene diamine components, alicyclic diamines, and aromatic diamines. These diamine components may be used singly or may be used in combination of two or more of these diamine components.

Examples of the lactam components include $C_{4-20}$ lactams such as δ-valerolactam, ε-caprolactam, ω-heptalactam, ω-octalactam, ω-decanelactam, ω-undecanelactam, ω-laurolactam (or ω-laurinlactam). These lactam components may be used singly or may be used in combination of two or more of these lactam components.

Examples of the aminocarboxylic acid components include $C_{4-20}$ aminocarboxylic acids such as ω-aminodecanoic acid, ω-aminoundecanoic acid, and ω-aminododecanoic acid. These aminocarboxylic acid components may be used singly or may be used in combination of two or more of these aminocarboxylic acid components.

Further, the polyamide-based resin may contain long chain components having a long aliphatic chain (long chain alkylene group or alkenylene group) as constitutional units.

Such long chain components include components having a long aliphatic chain or alkylene group having about 8 to about 36 carbon atoms (preferably a $C_{8-16}$ alkylene group, and more preferably a $C_{10-14}$ alkylene group).

As the long chain components, for instance, one component selected from a $C_{8-18}$ alkane dicarboxylic acid, a $C_{9-17}$ lactam, and an amino-$C_{9-17}$ alkanecarboxylic acid may be used or a combination of two or more of these components may be used.

The polyamide-based resin may include an amide forming component, for instance, polyamide 11, polyamide 12, polyamide 610, polyamide 612, and polyamide 1010 as a constitutional unit.

The polyamide-based resin may be a copolymer of some of the amide forming components in the amide forming components mentioned above or may be a copolymer of one of the amide-forming components or some of the amide-forming components in the amide-forming components mentioned above and other amide forming components. As other amide forming components, for instance, at least one amide forming component selected from polyamide 6 and polyamide 66 may be used.

As the polyamide-based resin, a commercially available product can be appropriately selected and used.

When the polyamide-based resin is a polyamide block copolymer, the polyamide block copolymer may be a polyamide-polyether block copolymer, may be a polyamide-polyester block copolymer, and may be a polyamide-polycarbonate block copolymer. In particular, the polyamide-polyether block copolymer is preferable.

In such a block copolymer, diol components such as aliphatic diols, alicyclic diols, and aromatic diols and/or dicarboxylic acid components such as aliphatic dicarboxylic acids, alicyclic dicarboxylic acids, and aromatic dicarboxylic acids may be constituents of the block contained in the molecules.

The polyamide block copolymer is obtained by copolymerizing a combination of polyamide blocks having reactive end groups and any one or more of polyether blocks, polyester blocks, and polycarbonate blocks having reactive end groups.

For instance, the polyamide-polyether block copolymer is obtained by copolymerizing the polyamide blocks having reactive end groups and polyether blocks having reactive end groups as exemplified in (1) to (3) below.

(1) polyamide blocks having diamine chain ends, and polyoxyalkylene blocks having dicarboxylic acid chain ends, (2) polyamide blocks having dicarboxylic acid chain ends, and polyoxyalkylene blocks having diamine chain ends obtained by cyanoethylation and hydrogenation of an aliphatic dihydroxylated α,ω-polyoxyalkylene block called a polyether diol, and (3) polyamide blocks having dicarboxylic acid chain ends, and polyether diols.

The polyamide block is not specifically restricted and, for instance, polyamide 12 obtained by polymerizing lauryllactam as a monomer is preferable.

The polyether block is not specifically restricted and a polyether block mainly constituted of polytetramethylene ether glycol (PTMG) is preferable.

The ratio of the polyether blocks, polyester blocks, or polycarbonate blocks having reactive end groups is not specifically restricted and preferably 5% by weight to 90% by weight, more preferably 10% by weight to 90% by weight, and further preferably 20% by weight to 90% by weight relative to the polyamide-based resin.

The polyamide-based resin layer 6 may also contain other resins such as homopolyamide, in addition to the polyamide as mentioned above. The homopolyamide may be, for instance, a homopolyamide having a component forming the polyamide-based resin.

The polyamide-based resin layer 6 may contain other components such as modified polyolefin, unmodified polyolefin, and an acrylic resin in addition to the polyamide mentioned above.

The form of polyamide-based resin layer is not specifically restricted. For instance, the form may be a film-like form or a sheet-like form and a state where the polyamide-based resin is melted in order to provide for injection molding and extrusion laminating.

To the strands and intermediate layer used in the cloth layered sheet, the modified-polyolefin layer, the copolymerized polyamide layer, and the polyamide-based resin layer, various additives may be added depending on intended purposes.

Specific examples of the additives include organic phosphorus-based and thioether-based antioxidants; hindered amine-based light stabilizers; benzophenone-based, benzotriazole-based, and benzoate-based ultraviolet absorbers; an antistatic agent; bisamide-based, wax-based, and organometallic salt-based dispersants; amide-based and organometallic salt-based lubricants; bromine-containing organic-based, phosphoric acid-based, melamine cyanurate-based, and antimony trioxide fire retardants; low-density polyethylene-based and linear low-density polyethylene-based stretching aids; organic pigments; inorganic pigments; inorganic fillers; organic fillers; metal ion-based inorganic antibacterial agents; and organic antibacterial agents.

(Method for Producing Second Layered Sheet)

The method for producing the second layered sheet is not specifically restricted and the methods (1) to (3) described as the methods for producing the first layered sheet can be employed. For the details in the methods, the description described for the first layered sheet can be used as a reference.

Of these methods, the method (1) can be preferably used from the viewpoint of mass production. In the case of the method (1), for instance, the second layered sheet can be produced in a similar manner to the first layered sheet as shown in FIG. 5. In FIG. 5, the parts having the same reference numerals as in the above-mentioned first layered sheet are the parts having the same constitution. For the part not particularly described, the above description for the first layered sheet is used as a reference and description of the part will be omitted here.

In the example of FIG. 5, the production method in which the layered sheet comprised of the cloth layered sheet 2, the modified-polyolefin layer 3, the copolymerized polyamide layer 4, and the polyamide-based resin layer 6 is molded at once is described. However, the production method is not restricted to this method. The method may include the steps of producing the layered sheet pre-product mentioned below, and injecting the melted resin forming the polyamide-based resin layer 6 onto the upper surface side of the copolymerized polyamide layer in the layered sheet pre-product to form the layered sheet.

(Third Layered Sheet)

The third layered sheet will be described below with reference to FIG. 2(a). FIG. 2(a) is a diagram showing an example of the layer constitution of the third layered sheet. In FIG. 2, the parts having the same reference numerals as in FIG. 1(a) described in the above-mentioned first layered sheet are the parts having the same constitution. For the part not particularly described, the above description for the first layered sheet is used as a reference and description of the part will be omitted here.

The third layered sheet 1 is constituted by layering the modified-polyolefin layer 3, the copolymerized polyamide layer 4, and the thermoplastic polyurethane-based resin layer 5 in this order on one surface of the cloth layered sheet 2 and layering the modified-polyolefin layer 3, the copolymerized polyamide layer 4, and the thermoplastic polyurethane-based resin layer 5 or the polyamide-based resin layer 6 in this order on the other surface of the cloth layered sheet 2.

This constitution allows the layered sheet having further improved mechanical properties to be obtained. In particular, a function of strongly adhering between the layers can be exhibited by layering each of the layers in the order mentioned above.

(Method for Producing Third Layered Sheet)

The method for producing the third layered sheet is not specifically restricted. A part of the layer constituents constituting the layered sheet may be layered on one surface of the cloth layered sheet and thereafter the remaining components may be layered on the other surface or the constituent components may be layered on both surfaces at once by the similar method to the method for the first layered sheet or the second layered sheet mentioned above.

When the thermoplastic polyurethane-based resin layer 5 is layered on one surface of the cloth layered sheet 2 and the thermoplastic polyurethane-based resin layer 5 is also layered on the other surface, the thermoplastic polyurethane-based resin layers 5 may be similar compositions or may be different compositions.

(Fourth Layered Sheet)

The fourth layered sheet will be described below with reference to FIG. 2(b). FIG. 2(b) is a diagram showing an example of the layer constitution of the fourth layered sheet. In FIG. 2(b), the parts having the same reference numerals as in FIG. 1(b) and FIG. 2(a) described in the above-mentioned second layered sheet and the third layered sheet are the parts having the same constitution. For the part not particularly described, the above description for the second layered sheet and the third layered sheet is used as a reference and description of the part will be omitted here.

The fourth layered sheet 1 is constituted by layering the modified-polyolefin layer 3, the copolymerized polyamide layer 4, and the polyamide-based resin layer 6 in this order on one surface of the cloth layered sheet 2 and layering the modified-polyolefin layer 3, the copolymerized polyamide layer 4, and the thermoplastic polyurethane-based resin layer 5 or the polyamide-based resin layer 6 in this order on the other surface of the cloth layered sheet 2.

This constitution allows the layered sheet having further improved mechanical properties to be obtained. In particular, a function of strongly adhering between the layers can be exhibited by layering each of the layers in the order mentioned above.

(Method for Producing Fourth Layered Sheet)

The method for producing the fourth layered sheet is not specifically restricted. A part of the layer constituents constituting the layered sheet may be layered on one surface of the cloth layered sheet and thereafter the remaining components may be layered on the other surface or the constituent components may be layered on both surfaces at once.

When the polyamide-based resin layer 6 is layered on one surface of the cloth layered sheet 2 and the polyamide-based resin layer 6 is also layered on the other surface, the polyamide-based resin layers 6 may be similar compositions or may be different compositions.

(First Layered Sheet Pre-Product)

Examples of an aspect of the first layered sheet pre-product include a layered sheet pre-product before forming the thermoplastic polyurethane-based resin layer 5 in the first layered sheet shown in FIG. 1(a).

Examples of another aspect of the first layered sheet pre-product include a layered sheet pre-product before forming the polyamide-based resin layer 6 in the second layered sheet shown in FIG. 1(b).

In other words, the first layered sheet pre-product is formed by layering the cloth layered sheet 2, the modified-polyolefin layer 3, and the copolymerized polyamide layer 4 in this order.

The layered sheet pre-product may also be provided with a release paper at the copolymerized polyamide layer 4 side. This constitution can prevent adhesion of the copolymerized polyamide layer 4 to other articles during transport of the layered sheet pre-product.

(Method for Producing First Layered Sheet Pre-Product)

Subsequently, the method for producing the first layered sheet pre-product will be described.

The method for producing the first layered sheet pre-product is not specifically restricted and the methods described in (1) and (2) are preferably exemplified.

(1) A method including the steps of obtaining a cloth layered sheet by layering a plurality of cloths comprised of thermoplastic resin strands and thereafter subjecting the layered product to thermocompression bonding, and layering the modified-polyolefin layer 3 and copolymerized polyamide layer 4 in this order on the obtained cloth layered sheet and subjecting the layered product to thermocompression bonding.

(2) A method including the steps of layering a plurality of cloths comprised of thermoplastic resin strands, layering the modified-polyolefin layer 3 and copolymerized polyamide layer 4 in this order on the upper surface of the obtained cloth layered sheet, and subjecting the layered product to thermocompression bonding.

In the methods (1) and (2), the modified-polyolefin layer 3 and the copolymerized polyamide layer 4 are preferably films.

As the thermocompression bonding, all layers may be subjected to thermocompression bonding at once or the layers are divided into several layers and these several layers are subjected stepwise to thermocompression bonding.

Such a layered sheet pre-product is useful for obtaining the first layered sheet and the second layered sheet.

In particular, in the method for producing the layered sheet, such a layered sheet pre-product is preferable when the place where the layered sheet pre-product formed by layering the cloth layered sheet 2, the modified-polyolefin layer 3, and the copolymerized polyamide layer 4 in this order is produced and the place where the layered sheet is obtained thereafter by layering the thermoplastic polyurethane-based resin layer 5 or the polyamide-based resin layer 6 are different.

This is because the production process of the layered sheet may have flexibility due to the layered sheet pre-product.

(Second Layered Sheet Pre-Product)

Examples of the aspect of the second layered sheet pre-product include a layered sheet pre-product before forming the thermoplastic polyurethane-based resin layer 5 in the third layered sheet shown in FIG. 2(a).

Examples of another aspect of the second layered sheet pre-product include a layered sheet pre-product before forming the polyamide-based resin layer 6 in the fourth layered sheet shown in FIG. 2(b).

In other words, the second layered sheet pre-product is formed by layering the copolymerized polyamide layer 4, the modified-polyolefin layer 3, the cloth layered sheet 2, the modified-polyolefin layer 3, and the copolymerized polyamide layer 4 in this order. In this process, the thermoplastic polyurethane-based resin layer or the polyamide-based resin layer may also be layered on the upper surfaces of the two polyamide-based resin layers 4 or the thermoplastic polyurethane-based resin layer or the polyamide-based resin layer may also be layered on either one of the copolymerized polyamide layers 4.

The second layered sheet pre-product may also be provided with a release paper at the copolymerized polyamide layer 4 side. This constitution can prevent adhesion of the copolymerized polyamide layer 4 to other articles during transport of the second layered sheet pre-product.

Such a second layered sheet pre-product is useful for obtaining the third layered sheet and the fourth layered sheet. In particular, in the method for producing the layered sheet, such a layered sheet pre-product is preferable when the place where the layered sheet pre-product formed by layering the copolymerized polyamide layer 4, the modified-polyolefin layer 3, the cloth layered sheet 2, the modified-polyolefin layer 3, and the copolymerized polyamide layer 4 in this order is produced and the place where the layered sheet is obtained thereafter by layering the thermoplastic polyurethane-based resin layer 5 or the polyamide-based resin layer 6 are different.

This is because the production process of the layered sheet may have flexibility due to the layered sheet pre-product.

The case where each of the modified-polyolefin layer, the copolymerized polyamide layer, and the thermoplastic polyurethane-based resin layer or the polyamide-based resin layer independently forms a layer is described above. However, the method is not restricted and the layered sheet may be formed by mixing the components forming the modified-polyolefin layer, the copolymerized polyamide layer, the thermoplastic polyurethane-based resin layer, and the polyamide-based resin layer within a range not impairing the physical properties (for instance, abrasion resistance) to which the layered sheet according to the present invention aims.

In particular, each of the modified-polyolefin layer and the copolymerized polyamide layer is preferably formed as an independent layer from the viewpoint of adhesion. However, a layer formed by mixing the modified polyolefin and the copolymerized polyamide may be employed depending on the level of the required adhesion.

The aspect of forming each layer of the cloth layered sheet, the modified-polyolefin layer, the copolymerized polyamide layer, and the thermoplastic polyurethane-based resin layer or the polyamide-based resin layer and layering these layers is described above. However, the aspect is not restricted to this aspect. As mentioned above, for instance, the cloths in the course of forming the cloth layered sheet and the modified-polyolefin layer and the copolymerized polyamide layer in the form of films can be layered and the layered product can be subjected to thermocompression bonding at one time.

The target that is layered on the other surface of the cloth layered sheet in the above description is not restricted to the modified-polyolefin layer, the copolymerized polyamide layer, and the thermoplastic polyurethane-based resin layer. Various layers may be layered depending on purposes, applications, and the like. For instance, the added value of the cloth layered sheet product caused by visual sense can be enhanced by attaching, for instance, a PET film or a non-woven fabric.

The applications of the layered sheet according to the present invention are not specifically restricted. For instance, examples of the applications include constitutional parts constituting shoes, suitcases, and the like, and in particular, constitutional parts constituting shoe soles and shoes.

When the layered sheet according to the present invention is used in the shoe sole, it is preferable that the thermoplastic polyurethane-based resin layer or the polyamide-based resin layer be disposed as the surface at the side of contacting with the ground.

EXAMPLES

Examples of the present invention will be described below, but the present invention is not restricted to these Examples.

Example 1

I. Preparation of Layered Sheet
1. Preparation of Cloth Layered Sheet
(1) Preparation of Cloth A three-layered film (layer thickness ratio 1/8/1) as shown in FIG. 4(c) in which a low-melting point resin component was a surface layer and a high-melting point resin component was a base layer was obtained by a inflation molding method using polypropylene (MFR=0.4 g/10 min, weight average molecular weight Mw=630,000, melting point 164° C.) as the high-melting point resin component and a propylene-ethylene random copolymer (MFR=7.0 g/10 min, weight average molecular weight Mw=220,000, melting point 125° C.) as the low-melting point resin component.

The obtained film was slit with a razor. Subsequently, the film was stretched 7 times on a hot plate at a temperature of 110° C. to 120° C. and subjected to 10% relaxation heat treatment in an oven with internal air circulation at a temperature of 145° C. to obtain a flat yarn having a yarn width of 4.5 mm and a fineness of 1,700 dtex (dt).

The obtained flat yarn was twill-weaved (15 warps/25.4 mm and 15 wefts/25.4 mm) using a Sulzer weaving machine to obtain a cloth.

(2) Preparation of Intermediate Layer

As the intermediate layer, a polypropylene film in which polypropylene (high-melting point resin component) having a melting point of 161° C. was contained in polypropylene (low-melting point resin component) having a melting point of 125° C. was used. The content of the high-melting point resin component in the intermediate layer was 15% by weight. The residual part was the low-melting point resin component.

(3) Thermocompression Bonding/Cooling

Four of the obtained cloth and the three of the obtained intermediate layer were alternately layered in the order of a cloth, an intermediate layer, a cloth, an intermediate layer, a cloth, an intermediate layer, and a cloth.

This layered product was hot pressed with an oil hydraulic press the press temperature of which was set to 150° C. at a pressure of 4 MPa for 2 minutes and thereafter cold pressed with an oil hydraulic press at a press temperature of 20° C. and a pressure of 4 MPa for 2 minutes to obtain a cloth layered sheet having a width of 20 cm and a length of 20 cm.

2. Preparation of Modified-Polyolefin Layer

As the modified-polyolefin layer, an acid-modified modified polypropylene film (melting point 134° C.) in which maleic acid was grafted was used.

3. Preparation of Copolymerized Polyamide Layer

As the copolymerized polyamide layer, a copolymerized polyamide film (melting point 127° C.) using ε-caprolactam as the monomer was used.

4. Preparation of Layered Sheet (1) The cloth layered sheet, the modified-polyolefin layer, and the copolymerized polyamide layer were hot pressed with an oil hydraulic press the press temperature of which was set to 145° C. at a pressure of 1 MPa for 2 minutes and thereafter cold pressed with an oil hydraulic press at a press temperature of 20° C. and a pressure of 5 MPa for 2 minutes to obtain a layered sheet pre-product in which Cloth layered sheet layer/Modified-polyolefin layer/Copolymerized polyamide layer were layered in this order.

(2) Subsequently, the layered sheet pre-product was disposed in a mold. A layered sheet was molded in the following conditions so that a thermoplastic polyurethane-based resin was injected onto the upper surface side of the copolymerized polyamide layer in the layered sheet pre-product to obtain the layered sheet 1.

(Molding Conditions)

Thermoplastic polyurethane-based resin: "Elastollan ET690-50", manufactured by BASF SE Cylinder temperature: 200° C.
Cycle time: 1 minute
Mold temperature: 40° C.
Cooling time: 20 seconds Comparative Example 1

The layered sheet 2 having a constitution of Cloth layered sheet/Thermoplastic polyurethane-based resin layer was obtained by the same method as the method in Example 1 except that the modified-polyolefin layer and the copolymerized polyamide layer were omitted in Example 1 "4. Preparation of layered sheet".

Comparative Example 2

The layered sheet 3 having a constitution of Cloth layered sheet/Modified-polyolefin layer/Thermoplastic polyurethane-based resin layer was obtained by the same method as the method in Example 1 except that the copolymerized polyamide layer was omitted in Example 1 "4. Preparation of layered sheet".

Comparative Example 3

The layered sheet 4 having a constitution of Cloth layered sheet/Copolymerized polyamide layer/Thermoplastic polyurethane-based resin layer was obtained by the same method as the method in Example 1 except that the modified-polyolefin layer was omitted in Example 1 "4. Preparation of layered sheet".

II. Adhesion Strength Check Test and Evaluation Method

For the layered sheets 1 to 4, a test for checking the adhesion strength between layers was conducted. The test was conducted by the peeling strength test in accordance with JIS K 6854-3 standard.

In this test, the sample width was determined to be 10 mm and a test speed was determined to be 100 mm/min. A plurality of samples were tested for each of the layered sheets 1 to 4. The obtained results of the adhesion strength were evaluated by the following evaluation criteria. The results are listed in Table 1.

<Evaluation Criteria>

◎: Adhesion strength is 25 N/cm or higher and thus this layered sheet can be used for a product requiring high interlayer adhesion ○: Adhesion strength is 15 N/cm or higher and lower than 25 N/cm and thus this layered sheet can be used for a product requiring low to medium interlayer adhesion X: Adhesion strength is lower than 15 N/cm and thus this layered sheet cannot be used as a layered sheet due to insufficient interlayer adhesion

TABLE 1

| Experimental No. | Layered sheet No. | Average value of adhesion strength (N/cm) | Evaluation |
|---|---|---|---|
| Example 1 | Layered sheet 1 | 32.2 | ◎ |
| Comparative Example 1 | Layered sheet 2 | Impossible to measure due to no adhesion | X |
| Comparative Example 2 | Layered sheet 3 | Impossible to measure due to no adhesion | X |
| Comparative Example 3 | Layered sheet 4 | Impossible to measure due to no adhesion | X |

<Evaluation>

From the results of Table 1, it is found that the layered sheet according to the present invention has an adhesion strength of 32.2 N/cm, which means that the layered sheet according to the present invention has excellent interlayer adhesion, and thus the layered sheet according to the present invention can be used for a product requiring high interlayer adhesion.

The layered sheet according to the present invention has the thermoplastic polyurethane-based resin layer at least one surface of the cloth layered sheet and thus has excellent abrasion resistance.

In summary, it can be said that the layered sheet according to the present invention is a useful layered sheet for the application requiring high abrasion resistance and interlayer adhesion.

Example 2

I. Preparation of Layered Sheet

The layered sheet 5 having a constitution of Cloth layered sheet/Modified-polyolefin layer/Copolymerized polyamide layer/Polyamide-based resin layer was obtained in the same method as the method in Example 1 except that a polyamide-based resin was injected instead of the thermoplastic polyurethane-based resin layer on the upper surface side of the copolymerized polyamide layer in the layered sheet pre-product in Example 1 "4. Preparation of layered sheet" and the layered sheet was molded using the following conditions. The molding conditions of the polyamide resin layer are as follows.

(Molding Conditions)

Polyamide-based resin: "Pebax 7033", manufactured by ARKEMA S. A.

Cylinder temperature: 250° C.
Cycle time: 1 minute
Mold temperature: 60° C.
Cooling time: 20 seconds Comparative Example 4

The layered sheet 6 having a constitution of Cloth layered sheet/Polyamide-based resin layer was obtained by the same method as the method in Example 2 except that the modified-polyolefin layer and the copolymerized polyamide layer were omitted in Example 2 "I. Preparation of layered sheet".

Comparative Example 5

The layered sheet 7 having a constitution of Cloth layered sheet/Modified-polyolefin layer/Polyamide-based resin layer was obtained by the same method as the method in Example 2 except that the copolymerized polyamide layer was omitted in Example 2 "I. Preparation of layered sheet".

Comparative Example 6

The layered sheet 8 having a constitution of Cloth layered sheet/Copolymerized polyamide layer/Polyamide-based resin layer was obtained by the same method as the method in Example 2 except that the modified-polyolefin layer was omitted in Example 2 "I. Preparation of layered sheet".

II. Adhesion Strength Check Test and Evaluation Method

For the layered sheets 5 to 8, the adhesion strength was evaluated in accordance with the same method as the evaluation test for the layered sheets 1 to 4. The results are listed in Table 2.

TABLE 2

| Experimental No. | Layered sheet No. | Average value of adhesion strength (N/cm) | Evaluation |
|---|---|---|---|
| Example 2 | Layered sheet 5 | 44.4 | ⊚ |
| Comparative Example 4 | Layered sheet 6 | Impossible to measure due to no adhesion | X |
| Comparative Example 5 | Layered sheet 7 | Impossible to measure due to no adhesion | X |
| Comparative Example 6 | Layered sheet 8 | Impossible to measure due to no adhesion | X |

<Evaluation>

From the result of Table 2, it is found that the layered sheet according to the present invention has an adhesion strength of 44.4 N/cm, which means that the layered sheet according to the present invention has excellent interlayer adhesion, and thus the layered sheet according to the present invention can be used for a product requiring high interlayer adhesion.

In summary, it can be said that the layered sheet according to the present invention is a useful layered sheet for the application requiring high abrasion resistance and interlayer adhesion.

REFERENCE SIGNS LIST

1: Layered Sheet
2: Cloth Layered Sheet
2a: Cloth Layered Sheet Pre-product
21: Cloth
210: Strand
220: Base Layer
230: Surface Layer
22: Intermediate Layer
3: Modified-polyolefin Layer
4: Copolymerized Polyamide Layer
5: Thermoplastic Polyurethane-based Resin Layer
6: Polyamide-based Resin Layer
7: Mold

The invention claimed is:

1. A layered sheet comprising a modified-polyolefin layer, a copolymerized polyamide layer, and a thermoplastic polyurethane-based resin layer layered in this order on one side of a cloth layered sheet formed by layering a plurality of cloths comprised of thermoplastic resin strands.

2. The layered sheet according to claim 1, wherein a modified-polyolefin layer, a copolymerized polyamide layer, and a thermoplastic polyurethane-based resin layer or a polyamide-based resin layer are layered in this order on the other side of the cloth layered sheet.

3. The layered sheet according to claim 1, wherein the modified-polyolefin layer is at least one modified polyolefin selected from acid-modified modified polypropylene or acid-modified modified polyethylene.

4. The layered sheet according to claim 1, wherein the modified-polyolefin layer and the copolymerized polyamide layer are films.

5. A layered sheet comprising a modified-polyolefin layer, a copolymerized polyamide layer, and a polyamide-based resin layer layered in this order on one side of a cloth layered sheet formed by layering a plurality of cloths comprised of thermoplastic resin strands.

6. A layered sheet pre-product comprising a modified-polyolefin layer and a copolymerized polyamide layer layered in this order on one side of a cloth layered sheet formed by layering a plurality of cloths comprised of thermoplastic resin strands.

7. The layered sheet pre-product according to claim 6, wherein a modified-polyolefin layer and a copolymerized polyamide layer are layered in this order on the other side of the cloth layered sheet.

8. A method for producing a layered sheet, the method comprising the steps of:
providing a cloth layered sheet formed by layering a plurality of cloths comprised of thermoplastic resin strands and thereafter subjecting the layered cloths to thermocompression bonding;
layering a modified-polyolefin layer on one side or both sides of the cloth layered sheet;
layering a copolymerized polyamide layer on an upper surface of the modified-polyolefin layer; and
subsequently layering a thermoplastic polyurethane-based resin layer or a polyamide-based resin layer on an upper surface of the copolymerized polyamide layer.

9. The method for producing a layered sheet according to claim 8, wherein
the modified-polyolefin layer and the copolymerized polyamide layer are films;
the cloth layered sheet is disposed in a mold;
the modified-polyolefin layer is disposed on one surface or both surfaces of the cloth layered sheet,
the copolymerized polyamide layer is disposed on the upper surface of the modified polyolefin layer, and
a resin forming the thermoplastic polyurethane-based resin layer or a resin forming the polyamide-based resin layer is injected into the mold from the upper surface side of the copolymerized polyamide layer.

10. A method for producing a layered sheet pre-product, the method comprising the steps of:
providing a cloth layered sheet formed by layering a plurality of cloths comprised of thermoplastic resin strands and thereafter subjecting the layered cloths to thermocompression bonding;
layering a modified-polyolefin layer on one side or both sides of the cloth layered sheet; and
layering a copolymerized polyamide layer on an upper surface of the modified-polyolefin layer.

11. The method for producing a layered sheet pre-product according to claim 10, wherein the modified-polyolefin layer and the copolymerized polyamide layer are films, and
the layered sheet pre-product is integratedly obtained by thermocompression bonding.

12. A method for producing a layered sheet pre-product, the method comprising the steps of:
providing a plurality of cloths comprised of thermoplastic resin strands;
layering a modified-polyolefin layer on one side or both sides of the cloths; and layering a copolymerized polyamide layer on an upper surface of the modified-polyolefin layer.

13. A method for producing a layered sheet, the method comprising the steps of:
- providing a layered sheet pre-product obtained by the method for producing a layered sheet pre-product according to claim 10;
- disposing the layered sheet pre-product in a mold; and
- injecting a resin forming the thermoplastic polyurethane-based resin layer or a resin forming the polyamide-based resin layer into the mold from an upper surface side of the copolymerized polyamide layer in the layered sheet pre-product.

* * * * *